Oct. 31, 1950     H. T. ORR ET AL     2,528,166

FRUIT KNIFE

Filed July 15, 1946

INVENTORS
Helen Thompson Orr
Lloyd Edwin Orr
BY James J. Cannon
ATTORNEY

Patented Oct. 31, 1950

2,528,166

UNITED STATES PATENT OFFICE 2,528,166

FRUIT KNIFE

Helen Thompson Orr, Bayside, N. Y., and
Lloyd Edwin Orr, Toledo, Ohio

Application July 15, 1946, Serial No. 683,722

4 Claims. (Cl. 30—24)

Our invention relates to a fruit knife and more particularly to a fruit knife to be used in dissecting the segments of a grapefruit.

The present method of cutting the segments of a grapefruit is either with a straight single edge paring knife or with a knife with a special blade which knife is semi-circular and narrows to the point. The use of those knives makes the job difficult as the membrane surrounding the segments is thin and numerous and must be cut around on both sides. The old methods take a long time and do an unsatisfactory job.

In our device we are able to cut both sides of the membrane at the same time and go about the segment very rapidly and do a much faster and cleaner job.

The following objects are accomplished by our invention. First, we do the cutting in less than half of the time. Second, we have a much cleaner cut. Third, we have no waste. Fourth, it is not possible to cut one's self with our device. Fifth, it does not mangle or squash the segments and keeps the juice in the fruit. Sixth, it cuts the fruit in a circular movement and results in a more fascinating segment. Seventh, it does not cut any rind but can cut around it without destroying the meat of the fruit or segments being cut.

Figure 1:
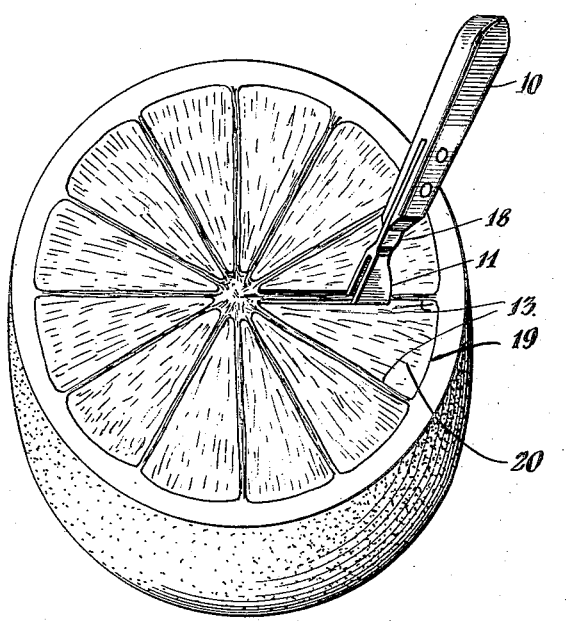
Figure 4:
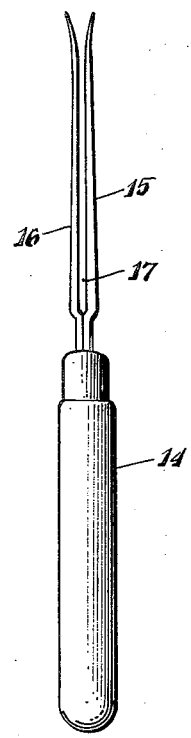
Figure 2:
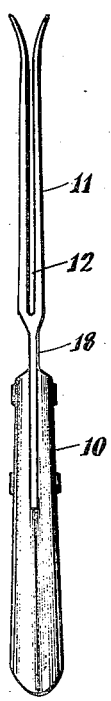
Figure 3:
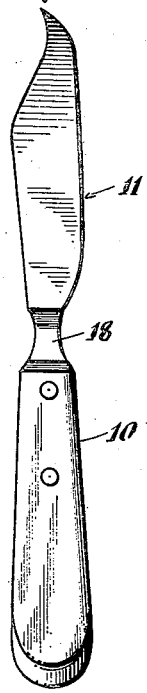

One form of our invention is illustrated in the accompanying drawing. Figure 1 is a figure illustration of the device in use. Figure 2 is an end elevation. Figure 3 is a side elevation. Figure 4 is an end elevation of a modified form.

Reading on Figures 1 to 3 inclusive, the knife consists of handle portion 10, which is split in a fork shaped knife section 11, the space between the knife section being 12. Reading on Figure 4, the knife has a handle 14 and two blades 15 and 16 and space section 17. Reading again on Figures 1 to 3 we have neck portion 18 and membrane of grapefruit 13, inner surface of grapefruit 19 and segment of grapefruit 20. The blades have, at their ends opposite to the handle, a slight flare to a point as shown in Figs. 2 and 4.

In operation the knife is placed into grapefruit so that the membrane 13 is in the space opening 12 or 17 of the blade 11 or blades 15 and 16 depending whether the one knife shown in Figures 1 to 3 or Figure 4 is used. When the knife is so placed it is worked along membrane 13 and inner edge 19 and again about membrane 13 until segment 20 is completely cut about and is loose so that it can be easily lifted out of place by a fork when one desires to use the fruit. Each of the other sections can be loosened in like fashion.

The blades 11 and 15 and 16 may be made of steel but could also be made of glass or any other material commonly used for making knife blades. Said blades may have a jagged edge.

The handle 10 or 14 may be made of wood or steel or glass or plastic or any material commonly used for knife handles.

Our device may be used for slicing potatoes, it may also be used for all citrus fruits such as oranges, lemons, etc. In fact it has uses too numerous to mention here.

While we have illustrated our invention in different ways and using different materials and means, still we do not intend to limit ourselves to those particular means, designs, methods, materials, or uses, as it is apparent that other means, designs, methods, materials, or uses, may be employed for obtaining the same or other results within the scope of any claim without departing from the scope or spirit of our invention.

We claim:

1. A fruit knife comprising, in combination, a handle, fork shaped blades, said forked shaped blades having a neck portion, said neck portion having a handle, said fork shaped blade having parallel cutting edges on one edge only, said forked shaped blades having an outward flare at the opposite ends to the handle of said fork shaped blades, said outer flare being only slight and flaring outwardly from the parallel sides of said forked shaped blades, for the purpose of improving the cutting edges only substantially as described.

2. A knife for cutting grapefruit and the like, having a fork shaped blade, said fork shaped blade having a shank end surrounded by a handle, said fork shaped blades being slightly spaced apart and having parallel cutting edges on one of said fork like edges, and said blades having a slight flare outwardly at the ends of said fork like blade the improvement being said slight flare only, substantially as described.

3. A knife, for cutting grapefruit and the like, having a double parallel blade, each blade having a shank end means for holding said shank ends together, said shank ends being encased in a handle, said blades having parallel cutting edges, and being slightly spaced apart, said blades having a slight flare outwardly from the parallel sides at the extremity opposite the handle, said blades being flexible, the novel improvement being the parallel blades having flexibility and having a slight outward flare at the ends thereof, substantially as described.

4. A fruit knife having two blades, a space between said blades and a neck portion, said neck portion being contained in a handle, said blades having parallel cutting edges, said blades tapering off at the extremity opposite the handle to a point, said blades having a slight flare at their outer ends, said improvement being the slight flare at the ends of said blades, substantially as described.

HELEN THOMPSON ORR.
LLOYD EDWIN ORR.

REFERENCES CITED

The following references are of record in the file of this patent:

UNITED STATES PATENTS

| Number | Name | Date |
|---|---|---|
| 1,226,797 | Newman | May 22, 1917 |
| 1,326,373 | Rice | Dec. 30, 1919 |
| 1,769,525 | Maness | July 1, 1930 |
| 2,051,680 | Collens | Aug. 18, 1936 |
| 2,130,949 | Collens | Sept. 20, 1938 |